Nov. 18, 1947.  F. W. YOUNG  2,431,009
FOAM CONTROL IN BROWN STOCK WASHING
Filed Oct. 8, 1943  4 Sheets-Sheet 1

INVENTOR.
FRANK W. YOUNG
BY Orton and Griswold
ATTORNEYS

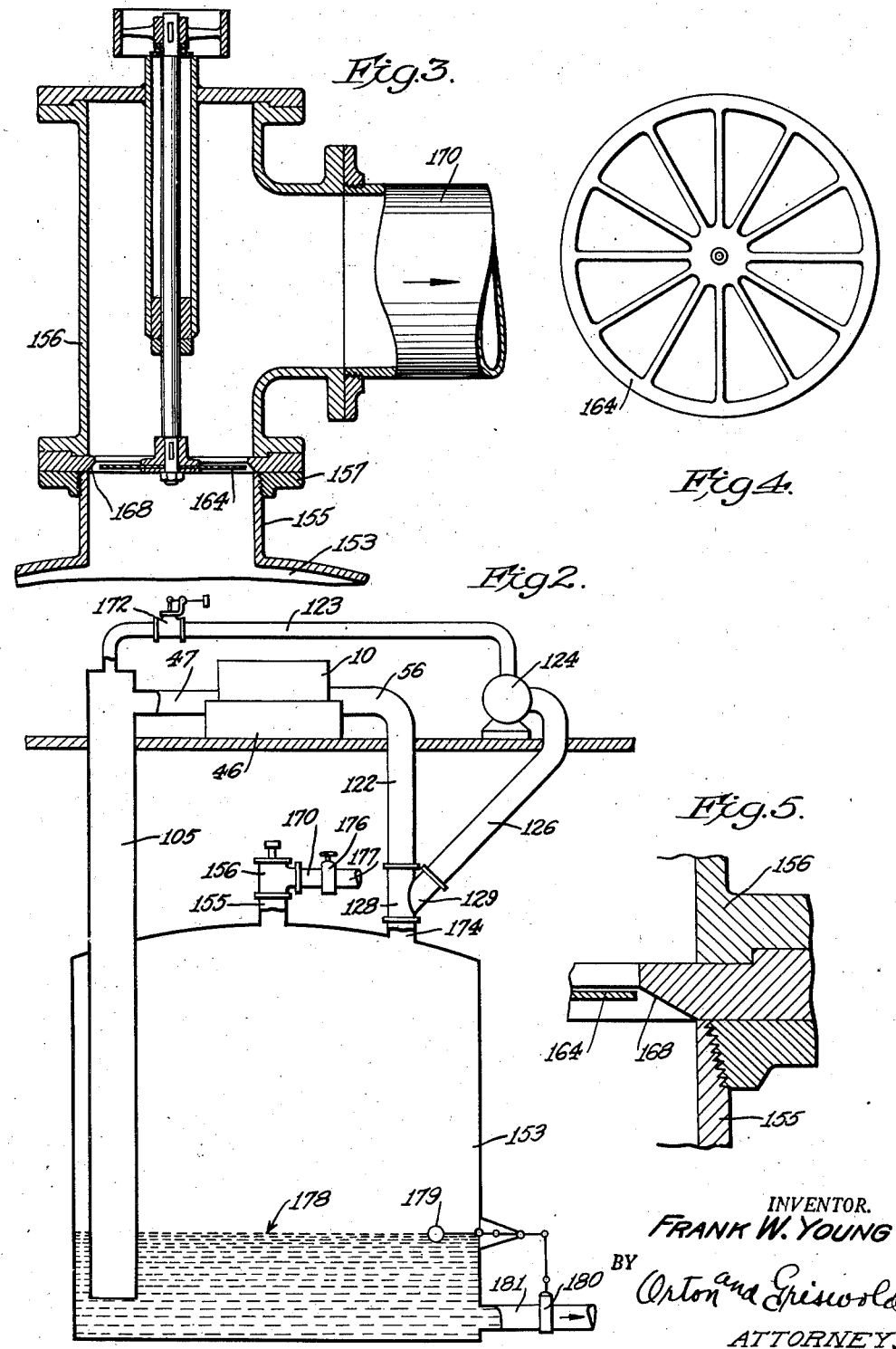

Nov. 18, 1947. F. W. YOUNG 2,431,009
FOAM CONTROL IN BROWN STOCK WASHING
Filed Oct. 8, 1943 4 Sheets-Sheet 3
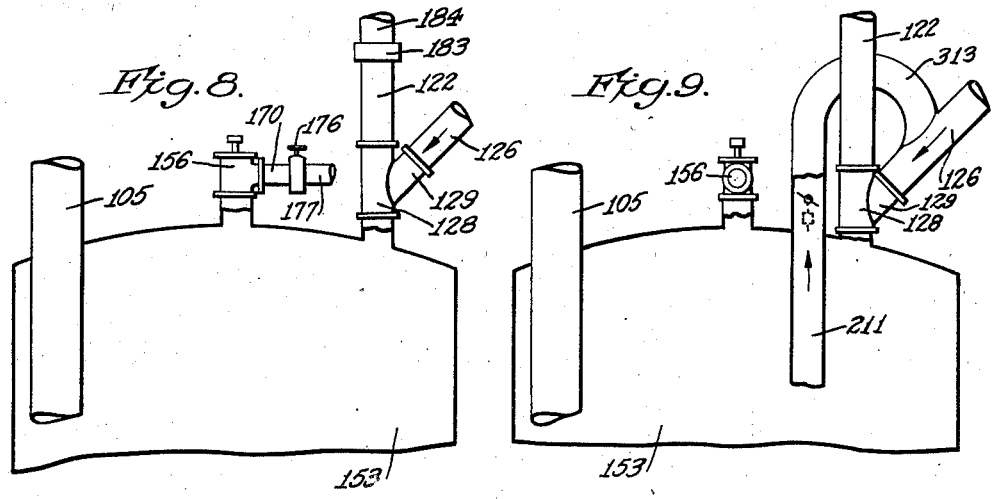
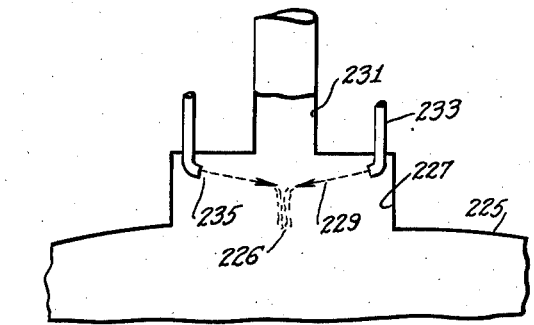
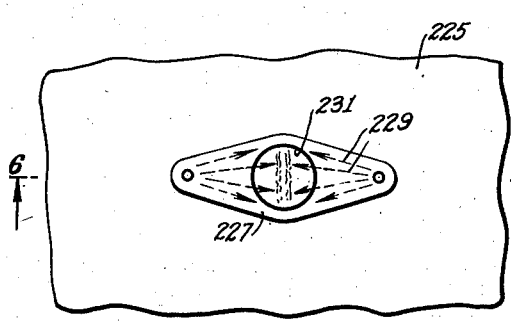
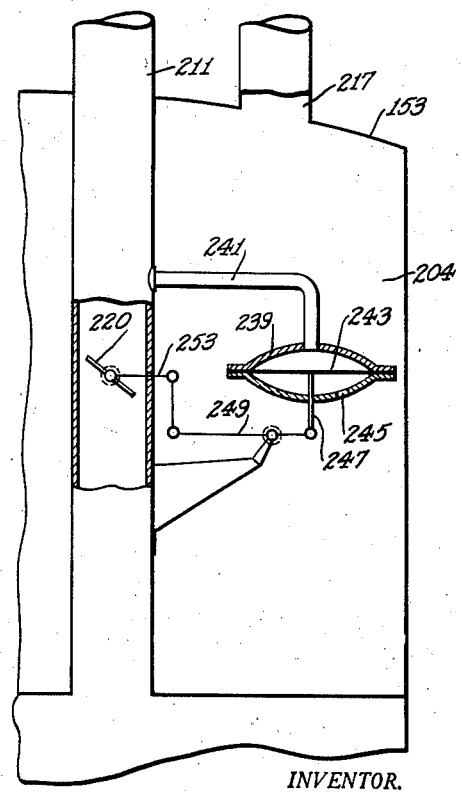
INVENTOR.
FRANK W. YOUNG
BY Orton and Griswold
ATTORNEYS Nov. 18, 1947.　　　　F. W. YOUNG　　　　2,431,009
FOAM CONTROL IN BROWN STOCK WASHING
Filed Oct. 8, 1943　　　4 Sheets-Sheet 4

INVENTOR.
FRANK W. YOUNG
BY
Orton and Griswold
ATTORNEYS

Patented Nov. 18, 1947

2,431,009

UNITED STATES PATENT OFFICE 2,431,009

FOAM CONTROL IN BROWN STOCK WASHING

Frank W. Young, Medfield, Mass.

Application October 8, 1943, Serial No. 505,478

5 Claims. (Cl. 252—321)

This invention relates to methods and apparatus for recovering solids from liquids in which they have been suspended, and washing the solids so recovered. More particularly, the invention relates to solids of such a chemical nature that their recovery is rendered difficult due to the production of a troublesome foam during their manufacture and handling. Heretofore, no effective method or apparatus has been suggested for controlling or disrupting the foam bubbles, saving the liquor and obtaining a comparatively dry air.

In the washing of brown stock (caustic sulphate wood pulp) in kraft mills, it is necessary at the present time, after the wood has been digested in the caustic liquid, to wash the resulting pulp free of the caustic liquor, resin and other impurities that have been disassociated by the digesting process. For reasons of economy, it is of advantage to recover the major portion of the caustic liquor for reuse. This has heretofore been done by washing the pulp in diffusers or wash pans and has required large and expensive equipment and considerable labor because of the large quantity of foaming liquid present. More recently, the pulp has been washed on continuous filters by countercurrent washing using, for instance, two filters for two-stage countercurrent washing, three filters for three stage countercurrent washing, and so on. The latter method of washing reduces labor and decreases the loss of caustic but the handling and rehandling of the pulp and liquors in each washing stage causes considerable and very troublesome foam. Because of this foam, the pumps, tanks and other equipment in the system as a whole are vented into a plurality of foam tanks or traps, many of these being needed and much space being occupied.

One object of the present invention is to perform multi-stage countercurrent washing of "brown stock" on a single filter without objectionable foam.

A further object of the invention is to reduce and maintain to a minimum the amount of foam produced in the recovery of caustic by washing.

In carrying the invention into effect, it is preferred to utilize a filter such as shown in copending application Serial No. 291,083, filed August 19, 1939, now Patent No. 2,352,303, issued June 27, 1944. All accessory equipment used with the filter or series of filters is hermetically sealed, the gaseous medium removed from the filter being returned to the filter for use in cake discharge.

It is a further object of the invention to utilize fluid withdrawn from the filter in the filtering operation to prevent the return of foam with the cake discharge or blow-back air.

The invention also seeks methods and apparatus for carrying out the methods, which are practical from the standpoint of ease and cheapness of installation and practicability in use.

This application is a continuation, in part, of my application Serial No. 350,286, filed August 3, 1940, now Patent No. 2,352,304, issued June 27, 1944.

These and other objects of the invention and the means for their attainment will be more apparent from the following detailed description taken in connection with the accompanying drawings illustrating one embodiment by which the invention may be realized and in which:

Figure 2 is a simplified view showing the structure illustrated in the upper right hand portion of Figure 1 to which mechanical foam eliminating means has been added;

Figure 3 is a vertical sectional view showing details of the mechanical foam eliminator of Figure 2;

Figure 4 is a plan view of the foam disrupting element of Figure 3;

Figure 5 is a fragmentary view on an enlarged scale showing details of the Figure 3 construction;

Figure 6 is a diagrammatic view showing a modified form of foam disrupting device;

Figure 7 is a fragmentary view looking from below in Figure 6;

Figure 8 is a fragmentary view of the structure shown in Figure 2 illustrating the application of the tank and piping when a pulp washer (not shown), is used and in which fluid pressure is not utiilzed for cake discharge;

Figure 9 is a modified form of the structure shown in Figure 12;

Figure 10 is a view showing automatic pressure regulation to balance the pressure in any two critical conduits;

Figure 1:
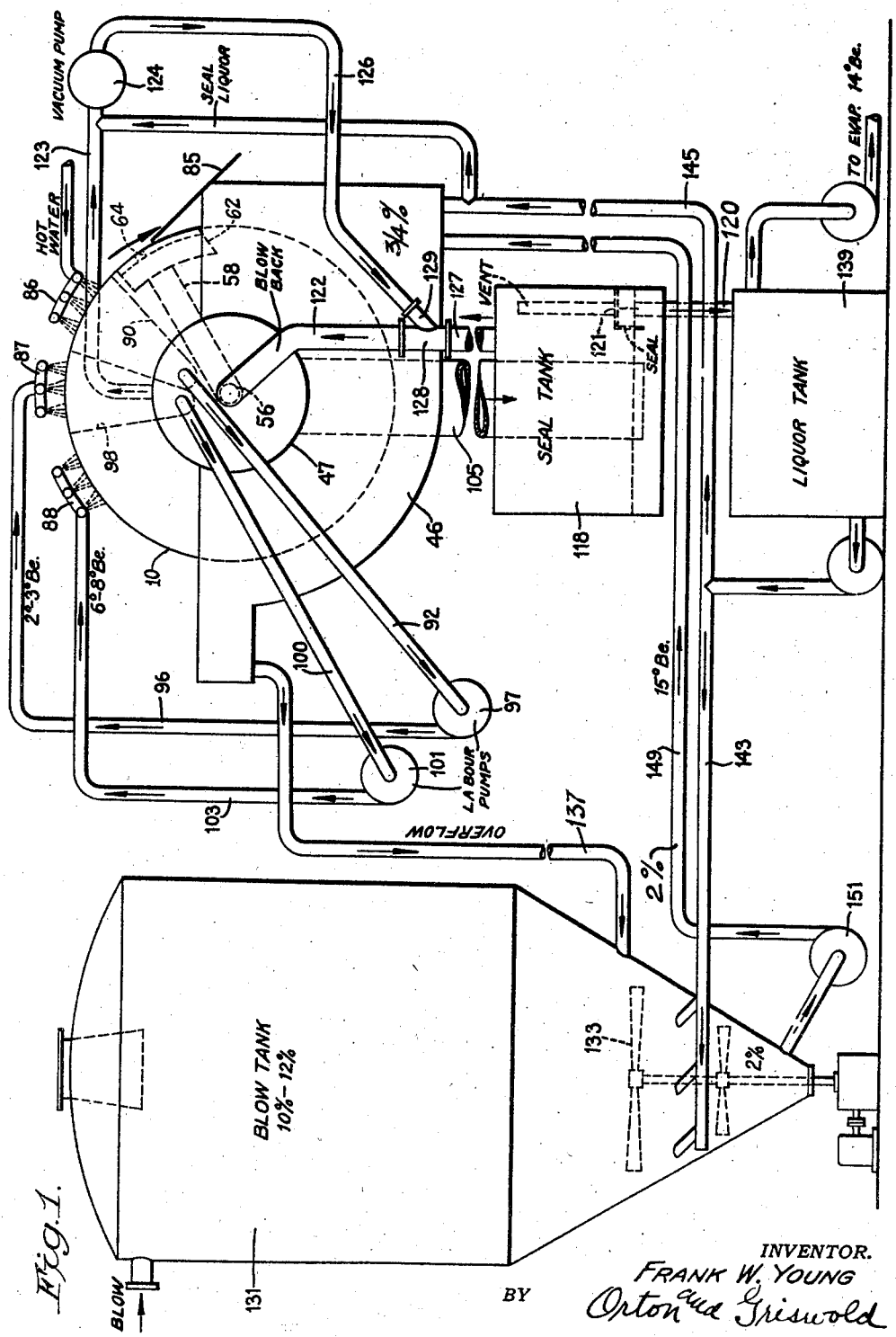
Figure 1 is a somewhat schematic view showing one form taken by the apparatus of this invention and illustrating a continuous filter by which multi-stage washing in accordance with the process of this invention may be performed.
Figure 11:
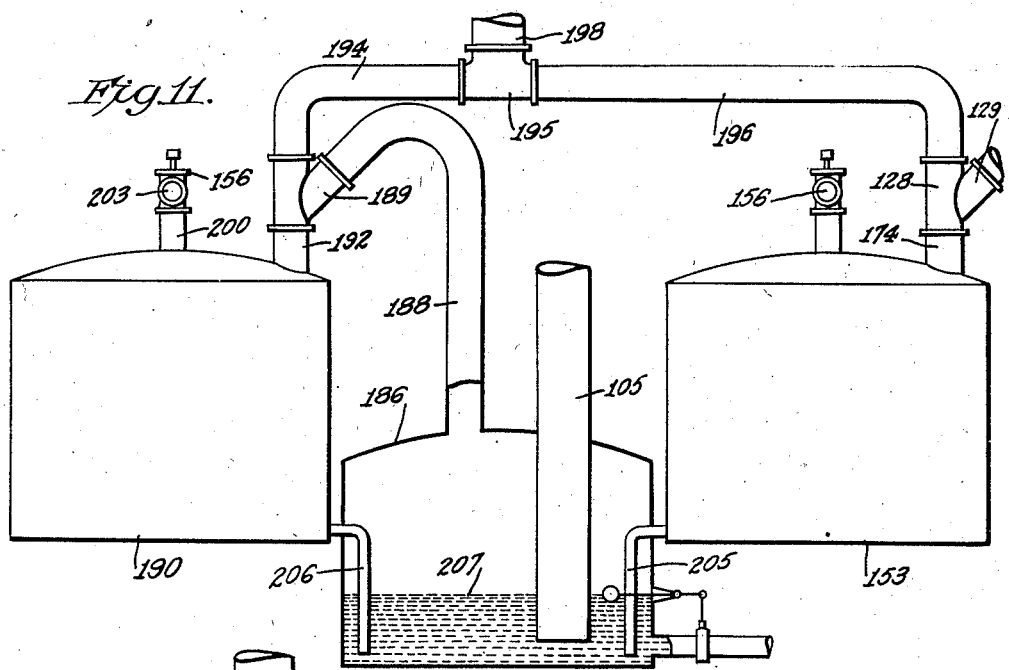
Figure 11 is a diagrammatic view showing the tanks and pipe lines when a vacuum filter pulp washer (not shown), is used in situations where the quantity of air carried down the barometric leg is excessive and produces considerable foam.

Referring now to the drawings for a fuller understanding of the apparatus of this invention and the process by which foam is controlled: The digested or cooked pulp is blown into the blow-tank 131 through the pipe marked "blow." This pulp, as blown into the blow-tank, is 10 to 12% consistency, too thick to pump, and contains about ten pounds of dry fiber and 90 pounds of liquor. In order to make this pulp thin enough so that it can be pumped to the filter and so that it can be handled properly on the filter, more liquor is added through the pipe 143. This is added to the bottom cone of the blow tank and is agitated with the pulp by the agitator 133. It has been advisable to have this diluted pulp at a consistency of 2%. The stock, agitated in the bottom of the blow tank, is pumped through the line 149 by the pump 151 and enters the filter tank 46. This 2% pulp is still too high a consistency for proper filtration. Therefore, further dilution is effected through the pipe line 145 so that the mixture of 2% stock and liquor becomes between 3/4 and one percent consistency in tank 46. To maintain uniform operation, and for ease of operation, an overflow is provided which carries the surplus solution in tank 46 back to the blow tank through pipe line 137. This is a small quantity and therefore the low consistency of this over-flow does not materially affect the consistency in the blow tank. In any event the consistency is still maintained.

A continuous filter adapted to perform multistage countercurrent washing of brown stock is shown in Figure 1 as comprising the filter drum 10 rotatably mounted on an axially extending cylindrical bearing member 47. The filter drum rotates in the filter tank 46 and the filter tank 46 is open to the atmosphere. During operation, the filtrate is removed from the interior of the filter drum through the hollow trunnion (bearing) 47 and falls through the barometric leg 105.

In operation, the vacuum filter drum 10 picks up the stock, withdrawing the liquid through the filter wire, and maintaining a filter cake of stock on the outside of the drum according to the usual manner of vacuum filtration. In the upper part of the rotation, medium wash liquor as from nozzles 88, then weak weight wash liquor as from nozzles 87, and finally hot water as from nozzle 86, is applied in three-stage countercurrent washing. The wash liquid falling, say, from a nozzle 86 ahead of the point where the cake leaves the drum, passes through the filter cake on that segment of the drum periphery and enters a pan 90 mounted therebeneath. An outlet pipe 92 from the pan 90 passes into and through the cylindrical bearing member 47 and from thence is conducted to pump 97. The weak wash liquor may then be pumped as by pump 97 through pipe 96 to nozzle 87 and passes through the filter cake into pan 98 from whence it is drawn through outlet pipe 100, and which stronger wash liquor may be pumped as by the pump 101 through pipe 103 to the shower 88. The wash liquor from spray 88 passes through the filter cake and into the interior of the drum where it mixes with the filtrate and is evacuated by bearing pipe 47 and barometric leg 105. This description is of a three-stage countercurrent washing and to those versed in the art is known to be heretofore regularly accomplished by using three filters. The washed pulp is discharged from the filter by the doctor 85.

Where a barometric leg is used, as at 105, for producing the vacuum, air drawn through the filter medium is carried down with the liquid in the barometric leg 105 and into the closed tank 118, where the air and liquid separate, the liquid flowing out of the closed tank 118 through the pipe 120 which traps the air under pressure in the closed seal tank 118 and controls the volume of air according to the height of the outlet 121.

The air is accumulated in the upper part of tank 118 at the pressure produced therein and is allowed free flow through pipe lines 127 and 122 into the blow-back pipe 56 leading to the air box 62. Thus the volume of air and the pressure thereof produced in the closed tank 118 can be utilized in the air box 62 to discharge the filter cake.

It is proposed, in accordance with one aspect of the invention, to remove the filtered material from the surface of the filter drum by a pressure differential upon opposite faces thereof. To this end, a conduit, such as the pipe 56, adapted to conduct air or other gaseous medium under pressure from the pipe 122, is disposed within the cylindrical bearing 47 and an extremity 58 thereof terminates within the drum interior. In the illustrated embodiment, a shoe 62 receives fluid medium under pressure from this conduit 58. The outer wall of the shoe is provided with an aperture 64 of a size to register, say, with one of the passages in the drum periphery.

A vacuum pump 124 is used to exhaust the air from the filter drum and produce the vacuum, and a barometric leg 105 is used to remove the filtrate. Some foam is carried through the pipe 123 by the vacuum pump 124 and exhausted through the pipe 126; some foam is carried down the barometric leg 105 and rises through the pipe 127. Both of these foams meet in the Y 129—129; the high velocity of the air and foam coming down pipe 126 and entering 129 meets the slow velocity foam coming up pipe 127. This action breaks up the foam into liquid and air, the liquid returns to the tank through pipe 127. The air, free of foam, travels up through pipe 122 and enters the blow-back pipe 56, 58 and is used for discharge of the filter cake.

Passing the blow-back air through the filter wire to lift the cake off the drum produces a slight back pressure which, in turn, is exerted in the tank 118. This back pressure tends to hold the foam in tank 118 and allows only air to rise in pipe 127. The foregoing cycle of operations is particularly effective where a small filter is used with a relatively large tank.

Where large filters are used in the aforesaid manner, the tank is relatively small compared with the size of the filter, and there is likely to be an accumulation of foam and an increase in pressure in tank 118. In order to relieve the pressure in tank 118 and prevent foam passing out through the relief 170, Figure 2, it is desirable to disrupt the foam into free air and liquid.

In kraft brown stock washing, two objects are paramount, one, to wash the pulp thoroughly so that the pulp discharged over the doctor 85 is clean enough to be used for making paper, and second, to retain in the system all of the chemicals for reuse. These recovered chemicals, consisting primarily of caustic soda and caustic sulphate are mixed with the wood chips in the digester. After cooking or digesting the wood which forms the pulp, these chemicals are in the liquid mixed with the pulp which is blown into the blow tank. A convenient but not absolutely correct method of measuring the amount of chemicals in the liquid is by degrees Baumé. In the illustrated embodiment, the Baumé of the liquor in the blow tank is shown at 15°. This liquor, drawn by vacuum through the filter wire, and delivered into the seal tank 118, then flows into the liquor tank 139 from which the major portion is recirculated for dilution in the blow tank 131 and dilution in the filter tank 46. The surplus, which in gallons equals the hot water wash put on as spray 86, is carried out of the over-flow of tank 139 to the evaporator.

During rotation of the filter 10, the sheet of pulp or filter cake containing liquor at 15° Baumé passes under the shower 88 containing liquor at about 6° to 8° Baumé. In the most efficient operation this liquor at 6° to 8° Baumé displaces the liquor at 15° Baumé in the sheet and the liquor at 15° Baumé enters the filter drum 10 and passes out of the barometric leg 105. The pulp sheet, then containing liquor at 6° to 8° Baumé passes under the shower 87 where a weaker liquor at 2° to 3° Baumé is sprayed on it and displaces the 6° to 8° Baumé liquor which is drawn out through pipe 100, pump 101 and back to the shower 88. The filter cake or pulp sheet now containing liquor at 2° to 3° Baumé passes under the hot water shower 86 where the hot water displaces the liquor, the liquor entering the compartment 99 passing down the pipe 92, pump 91, and pipe 96 to the shower 87. The clean sheet containing water is discharged on the doctor 85. It will be appreciated that in actual practice, 100% washing is not obtained. Therefore, the sheet coming off at 85 does not contain pure water. There is a slight soda content. This soda is lost. Some wash water passes countercurrent through the other stages and this will reduce the Baumé of the liquor in the filter tank from 15° Baumé to about 14° Baumé as it comes out of the liquor tank 139 and goes to the evaporator.

In the evaporator, the water is boiled off from this liquor at 14° Baumé thereby raising it to, say, 30° or 40° Baumé, and it is returned to the beginning of the cycle, that is, it is mixed with the wood chips and cooked. The wood chips contain water and water reduces Baumé again so that when the cooked stock is blown into the blow tank, it comes in there at about 15° Baumé.

Figures 2 through 12 show various modifications of the instrumentalities whereby foam may be eliminated from entering prior to the delivery of liquor to the evaporator or for recirculation in the apparatus. One such instrumentality, the foam eliminator, is illustrated in Figure 3 wherein the foam or bubbles rising in tank 153, Figure 2, pas out through the pipe 155 and into the foam eliminator 156 where they come in contact with the slotted disc or fan 164 rotating at high speed. This fan 164 breaks or disrupts the bubbles into small drops of liquid, which drops are thrown off by centrifugal force against the deflector plate surface 168, Figure 5, so that the liquid flows down the side walls of the pipe 155 back into the tank 153. The air passes out to atmosphere through the pipe 170.

When the foam eliminator is used in connection with a vacuum filter washer, Figure 2, using air blow-back for cake discharge, the liquid from the filter 10 passing through the trunnion 47 is carried down the barometric leg 105. The air containing foam is drawn from the top of the barometric leg through the pipe line 123, through the vacuum regulating valve 172 to the vacuum pump 124, discharges from the pump through the pipe 126 at high velocity into the Y 128, 129. The liquid and foam bubbles striking the opposite side of the Y 128 fall into the tank 153 through the pipe 174. The air, following the path of lowest pressure, travels, free of foam, up the pipe 122 into the conduit 56 of the filter where it is used for discharging the filter cake. This separation of foam and air will take place in Y 128, 129 provided the pressure in pipe 174 is slightly less than the pressure in pipe 126. The pressure in tank 153 and pipe 174 is maintained less than the pressure in line 126 by venting some air out of the top of the tank through pipe 155 and the foam eliminator 156. To prevent the venting of too much air, which would result in the pressure in pipe 122 being insufficient for cake discharge and so that the amount of air vented will not be in excess of that which can be handled by the foam eliminator, a valve 176 is placed in pipe 170 to control the volume and the pressure and the clean air is vented to atmosphere through the open end of pipe 177.

The barometric leg 105 is sealed by maintaining a constant level, 178, of liquid in the tank 153 by action of the float 179 acting through links and levers on the valve 180, allowing the liquor to flow out of the pipe 181 to, as in the case of kraft "black liquor," the evaporator for re-use.

In the washing of kraft stock, the "black liquor" is hot, frequently about 200° F. This strong caustic liquor has been diluted with water in the cooking process and in the pulp washing operation. Such water must be evaporated from the recovered liquor before re-use. It has been found that, in the instant invention, the foam eliminator 156 breaks the foam bubbles into small particles of concentrated liquor and small particles of water. The small particles of water at this, almost boiling, temperature are turned into steam or fog so that, in this instance, the eliminator emits water vapor and air, and not dry air. Therefore, the foam eliminator in this situation has a further advantage, in that it aids in the concentration of the "black liquor" and reduces the work of the evaporator.

When the foam eliminator is used in connection with a vacuum filter washer not using air blowback for cake discharge, Figure 8, the operation is the same as that just described except that the air traveling up pipe 122 does not go to the filter trunnion but passes through a pressure regulating valve 183 and then through the pipe 184 to atmosphere.

When air bubbles and entrained air are carried down the barometric leg in considerable quantities, which is usually the situation except when the barometric leg is of such exceedingly large diameter that the velocity of the falling liquor is very slow, this large quantity of air and foam must be handled separately and preferably in a manner similar to the exhaustion of the air and foam from the vacuum pump. Tank 153 is then used only for handling the discharge from the vacuum pump, see Figure 11, and an additional tank 186 takes care of the exhaust from the barometric leg 105. The air and foam are removed from the top of tank 186 through the pipe 188 entering a Y 189. Here, the liquor and foam bubbles, striking the opposite side of the Y 189 fall into tank 190 through the pipe 192. The air, following the path of lower pressure, travels, free of foam, up the pipe 194 into the T fitting 195 where the air unites with the air coming through the pipe 196 from the tank 153 and is directed through the pipe 198 to the filter for use as blow-back air or the air escapes through a pressure regulating valve not shown) to atmosphere. The pressure in tank 190 is maintained slightly below the pressure in pipe 186 by venting some air out of the top of the tank 190 through the pipe 209, a foam eliminator 156 and pipe 203. The liquor settling from the foam from pipes 174 and 192 into tanks 153 and 190, respectively, and the liquor broken down by the foam eliminators which settles in the bottom of the tanks 153 and 190 is drained into tank 186 by the pipes 205 and 206 that are sealed below the level of the liquor 207.

Figure 12:
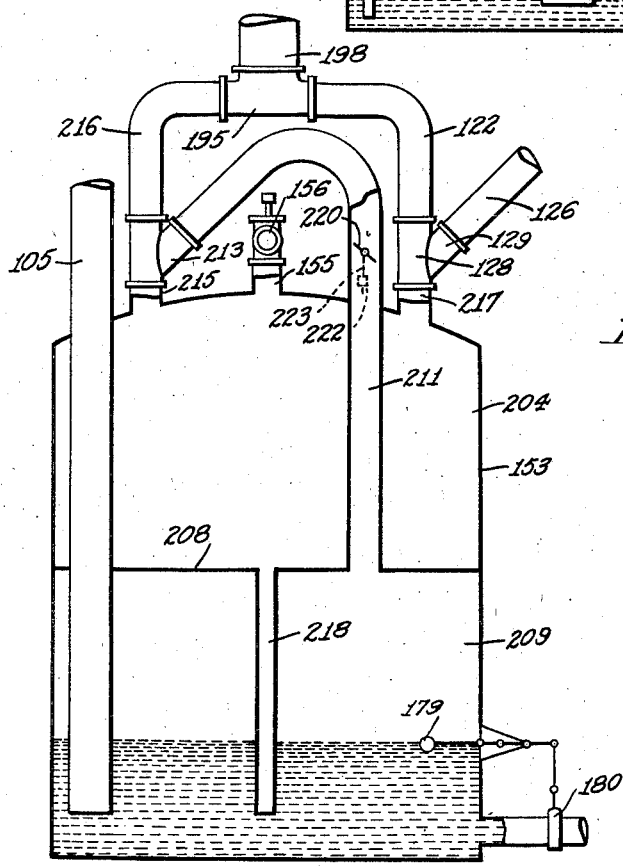
Figure 12 is a diagrammatic view similar to that of Figure 11 but showing a single tank subdivided by partitions instead of three separate tanks.

An improved method for handling the air and foam exhausted from the vacuum pump and exhausted from the barometric leg is shown in Figure 12. Tank 153 is divided into two parts by the partition 208 and the air and foam in the exhaust from the vacuum pump are separated by the Y 128-Y 129 in the same manner as described in connection with Figure 2 and the liquor and foam is collected in the upper part 204 of tank 153.

The foam accumulating in the bottom part 209 of the tank 153 is carried by the air from the barometric leg 105 up the pipe 211 and into the Y 213. There the liquid and foam bubbles striking the opposite side of the Y 213 fall into the upper part 204 of the tank 153 through the pipe 215. The air, following the path of lowest pressure, travels, free of foam, up the pipe 216, similar to the action in Y 129 and pipes 122 and 126. The air through the pipes 216 and 122 enter the T 195 and then travel through the pipe 196 to the blow-back discharge of the filter or through a pressure regulating valve to atmosphere. The liquors settling from the foam from pipes 215 and 217 and the liquors broken down by the foam eliminator coming down pipe 155 collect in the bottom of the upper part 204 of tank 153 and flow down through the pipe 218 that is sealed in the bottom of tank 153 and flows out with the rest of the liquor through the valve 180 as operated by the float 179.

The foregoing operation is rather critical. If the pressure in pipe 215 is greater than the pressure in pipe 217, the air and foam will travel up pipe 217 and a separation of air and foam coming down pipe 126 will not take place in Y 129 and troublesome foam will be carried up pipe 122. To balance these pressures a butterfly valve 220 is placed in pipe 211 and a weight 222 on lever rod 223 is automatically adjusted so that the pressure in the pipe 211 entering the Y 213 equals the pressure in pipe 126 entering the Y 129 so that the liquor and foam fall into the upper part of tank 153 through pipe 217 and to pipe 215.

A modified form of the instrumentality adopted to disrupt the foam is shown in Figures 6 and 7. The foam and bubbles rising in a tank 225 enter the compartment or extension thereof 227 and come in contact with flat, fan-shaped jets 235 of steam or other fluid and are disrupted thereby. The air freed from the foam and bubbles passes through the sprays 229 and is evacuated through the pipe 231, the liquid will not pass through the sprays and falls as a rain 226 into the tank 225. The sprays are produced by passing steam or other fluid through pipes 233 and fan-shaped spray producing jet nozzles 235. This type of foam eliminator when used on black liquor foam (kraft pulp process) gives results substantially equal to those obtained with the mechanical foam eliminator (Figure 2) although the addition of the water condensed from the steam is detrimental to the strength of the black liquor. In respect of many foam problems, however, the addition of such water or other fluids is not harmful.

Figure 10 illustrates instrumentalities to automatically control the pressure in pipe 211, Figure 12, and equivalent conduits, so that the pressure in pipe 215 equals or does not exceed that in pipe 217. By moving the butterfly valve 220 according to pressure on a diaphragm instead of setting the weight 222, a diaphragm chamber 239 is placed in the upper portion 204 of tank 153 or outside, with a pipe connected to opening 245 and tank 153. The diaphragm chamber is connected by pipe 241 to the pipe 211 above the butterfly valve 220. When the pressure in the upper part of pipe 211 exceeds the pressure in the pipe 217, which is also the pressure in the upper part of tank 153, this pressure is transmitted through pipe 241 to the upper side of the diaphragm 243 and pushes the diaphragm 243 down against the pressure in the tank admitted to the under side of the diaphragm 243 through the opening 245. When the diaphragm 243 moves downwardly it carries plunger 247 downwardly, which plunger, through a link and lever system, indicated generally at 249, pushes the arm 253 to close the valve 220 until the pressure in the upper part of pipe 211 equals the pressure in the pipe 217, whereupon the valve 220 is again opened by motion in the opposite direction of arm 253 when the pressure in the upper part of pipe 211 is less than the pressure in the pipe 217 or in the upper part of tank 153 which pressure tends to push the diaphragm 243 up. Obviously instead of the hole 245 in the chamber 239 communicating with the interior of the tank 153, the chamber 239 may be located outside of the tank 153, with a pipe connecting the opening 245 and the inside of the tank 153.

A modification of the structure shown in Figure 12, although involving substantially the same principles of operations, is illustrated in Figure 9. Here a pipe 211, conducting gaseous media, including bubbles and foam, from a lower portion of the tank 153, is reversely bent as at 313 and joins the pipe 126 conducting gaseous medium and foam to and through the Y 129. As before, the bubbles of foam are broken up in the Y 129 and the liquor falls into the tank 153, while the air, reversing direction, free from foam, travels at high velocity into slightly lower pressure up the pipe 122.

It will thus be seen that methods of and apparatus for the separation of air and liquid, initially combined as bubbles or foam, is provided by this invention. This foam is most pronounced in the handling of brown stock. The separation of the air and liquid may be effected by various instrumentalities, in any of which however, the foam or bubbles are disrupted whereby the air and the fluid in which the air is entrapped are caused to separate, the air being encouraged to go in one direction and the fluid, free of air, encouraged to go in a different direction.

Various modifications will occur to those skilled in the art in the configuration and disposition of the instrumentalities by which the gaseous and fluid media are caused in this field, to separate, after applicant has herein been the first to point the way and no limitation is intended by the phraseology of the foregoing description or il-

What is claimed is:

1. The method of eliminating foam in conduit means which comprises conducting a stream of liquid and air upwardly in conduit means and directing a second stream of liquid and foam at high velocity into intimate contact with the first-mentioned stream to disrupt the bubbles of foam into air and liquid.

2. The method of eliminating foam in conduit means which comprises conducting a stream of liquid and air upwardly in conduit means and directing a second, high velocity stream of liquid and air in the form of foam downwardly at an angle to the axis of flow of the first said stream.

3. Method of eliminating foam in conduit means which comprises impinging an ascending stream of foam with a second higher velocity stream of foam delivered downwardly at an angle to the axis of flow of the first stream.

4. Method of breaking foam in blow back lines of brown stock washers for liquid filters comprising subjecting a rising column of foam to the traversing impinging action of a second, higher velocity column of foam.

5. Method of breaking foam in blow back lines of brown stock washers for liquid filters comprising subjecting a rising column of foam to the downward angular impinging action of a second higher velocity column of foam.

FRANK W. YOUNG.

REFERENCES CITED

The following references are of record in the file of this patent:

UNITED STATES PATENTS

| Number | Name | Date |
|---|---|---|
| 1,176,428 | Callow | Mar. 21, 1916 |
| 1,376,073 | Borcherdt | Apr. 26, 1921 |
| 2,140,811 | Poole | Dec. 20, 1938 |
| 2,184,195 | Naucler | Dec. 19, 1939 |
| 2,257,945 | Fraser | Oct. 7, 1941 |
| 2,335,641 | Buckley | Nov. 30, 1943 |
| 908,951 | Carmichael | Jan. 5, 1909 |
| 1,449,114 | Hayduck | Mar. 20, 1923 |
| 1,967,938 | Jantzen et al. | July 24, 1934 |
| 2,231,544 | McCorquodale et al. | Feb. 11, 1941 |